US008002631B2

(12) United States Patent
Thomas et al.

(10) Patent No.: US 8,002,631 B2
(45) Date of Patent: Aug. 23, 2011

(54) GAMING MACHINE WITH ROTATING WILD FEATURE

(75) Inventors: Alfred Thomas, Las Vegas, NV (US); Dion K. Aoki, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 907 days.

(21) Appl. No.: 11/920,488

(22) PCT Filed: May 24, 2006

(86) PCT No.: PCT/US2006/019997
§ 371 (c)(1), (2), (4) Date: Nov. 16, 2007

(87) PCT Pub. No.: WO2007/018680
PCT Pub. Date: Feb. 15, 2007

(65) Prior Publication Data

US 2009/0104967 A1 Apr. 23, 2009

Related U.S. Application Data

(60) Provisional application No. 60/684,434, filed on May 25, 2005.

(51) Int. Cl.
*A63F 13/00* (2006.01)

(52) U.S. Cl. ................. 463/25; 463/16; 463/21; 463/31

(58) Field of Classification Search .................... 463/20, 463/16, 21, 31, 25
See application file for complete search history.

(56) References Cited

U.S. PATENT DOCUMENTS

| | | | | |
|---|---|---|---|---|
| 5,976,016 | A | 11/1999 | Moody et al. | 463/13 |
| 6,241,607 | B1 * | 6/2001 | Payne et al. | 463/20 |
| 6,439,993 | B1 | 8/2002 | O'Halloran | 463/16 |
| 6,494,785 | B1 | 12/2002 | Gerrard et al. | 463/20 |
| 6,517,432 | B1 | 2/2003 | Jaffe | 463/16 |
| 6,551,187 | B1 | 4/2003 | Jaffe | 463/20 |
| 6,638,169 | B2 | 10/2003 | Wilder et al. | 463/35 |
| 6,645,073 | B2 | 11/2003 | Lemay et al. | 463/20 |
| 6,739,971 | B2 | 5/2004 | Devaull | 463/20 |
| 6,780,109 | B2 | 8/2004 | Kaminkow | 463/20 |
| 6,805,349 | B2 | 10/2004 | Baerlocher et al. | 273/138.2 |

(Continued)

FOREIGN PATENT DOCUMENTS

AU 199943487 3/2000

(Continued)

OTHER PUBLICATIONS

International Application No. PCT/US06/19997, Search Report dated Mar. 19, 2007 (2 pages).

(Continued)

*Primary Examiner* — Masud Ahmed
(74) *Attorney, Agent, or Firm* — Nixon Peabody LLP

(57) ABSTRACT

A gaming machine for conducting a wagering game includes a value input device for receiving a wager, an array of positions for displaying respective randomly selected symbols, and a controller. The displayed symbols include a special symbol and a chain of adjacent symbols at least partially encompassing the special symbol. The controller is operative to progressively move and stop the chain of adjacent symbols at each of a plurality of locations and evaluate the array for any winning combinations of the displayed symbols when the chain of adjacent symbols is stopped at each location.

27 Claims, 7 Drawing Sheets

ROTATING WILD ROTATION 1
PAYLINES HIT: 1, 13, 15, 17

U.S. PATENT DOCUMENTS

| | | | | |
|---|---|---|---|---|
| 6,805,632 | B2 | 10/2004 | Suda | 463/25 |
| 6,805,633 | B2 | 10/2004 | Hein, Jr. et al. | 463/35 |
| 6,843,725 | B2 | 1/2005 | Nelson | 463/40 |
| 6,848,996 | B2 | 2/2005 | Hecht et al. | 463/35 |
| 6,866,583 | B2 | 3/2005 | Glavich et al. | 463/20 |
| 6,905,406 | B2 | 6/2005 | Kaminkow et al. | 463/20 |
| 6,910,962 | B2 | 6/2005 | Marks et al. | 463/16 |
| 6,921,335 | B2 | 7/2005 | Rodgers et al. | 463/30 |
| 6,968,063 | B2 | 11/2005 | Boyd | 381/57 |
| 7,104,888 | B2 | 9/2006 | Miereau et al. | 463/20 |
| 7,144,322 | B2 | 12/2006 | Gomez et al. | 463/20 |
| 7,182,690 | B2 | 2/2007 | Giobbi et al. | 463/24 |
| 2002/0047238 | A1 | 4/2002 | Ainsworth et al. | 273/292 |
| 2002/0052233 | A1 | 5/2002 | Gauselmann | 463/20 |
| 2002/0082075 | A1 | 6/2002 | Meyer | 463/20 |
| 2003/0013517 | A1 | 1/2003 | Bennett et al. | 463/25 |
| 2003/0054874 | A1 | 3/2003 | Kaminkow | 463/20 |
| 2003/0057645 | A1 | 3/2003 | Baelocher et al. | 273/138.2 |
| 2003/0060267 | A1 | 3/2003 | Glavich et al. | 463/20 |
| 2003/0064779 | A1 | 4/2003 | Suda | 463/20 |
| 2003/0064802 | A1 | 4/2003 | Rodgers et al. | 463/30 |
| 2003/0069062 | A1 | 4/2003 | Shimizu | 463/20 |
| 2003/0073490 | A1 | 4/2003 | Hecht et al. | 463/35 |
| 2003/0073491 | A1 | 4/2003 | Hecht et al. | 463/35 |
| 2003/0100359 | A1 | 5/2003 | Loose et al. | 463/20 |
| 2003/0203752 | A1 | 10/2003 | Kaminkow et al. | 463/20 |
| 2003/0203753 | A1 | 10/2003 | Muir et al. | 463/20 |
| 2003/0207709 | A1 | 11/2003 | Paotrakul | 463/20 |
| 2003/0211881 | A1 | 11/2003 | Walker et al. | 463/20 |
| 2004/0033829 | A1 | 2/2004 | Pacey et al. | 463/20 |
| 2004/0038730 | A1 | 2/2004 | Suda | 463/20 |
| 2004/0048646 | A1 | 3/2004 | Visocnik | 463/16 |
| 2004/0048652 | A1 | 3/2004 | Ching et al. | 463/20 |
| 2004/0053676 | A1 | 3/2004 | Rodgers | 463/20 |
| 2004/0053695 | A1 | 3/2004 | Mattice et al. | 463/42 |
| 2004/0072612 | A1 | 4/2004 | Rodgers et al. | 463/20 |
| 2004/0082388 | A1 | 4/2004 | Simsek et al. | 463/43 |
| 2004/0137982 | A1 | 7/2004 | Cuddy et al. | 463/20 |
| 2004/0138889 | A1 | 7/2004 | Gilboy et al. | 704/270 |
| 2004/0147316 | A1 | 7/2004 | Nagano | 463/35 |
| 2004/0162133 | A1 * | 8/2004 | Jackson | 463/20 |
| 2004/0209662 | A1 | 10/2004 | Wadleigh | 463/16 |
| 2005/0020344 | A1 | 1/2005 | Kaminkow | 463/16 |
| 2005/0049035 | A1 | 3/2005 | Baerlocher et al. | 463/20 |
| 2005/0054412 | A1 | 3/2005 | Gauselmann | 463/16 |
| 2005/0054436 | A1 | 3/2005 | Frizzell et al. | 463/25 |
| 2005/0064924 | A1 | 3/2005 | Glavich et al. | 463/13 |
| 2005/0101369 | A1 | 5/2005 | Meyer | 463/16 |
| 2005/0101380 | A1 | 5/2005 | Glavich et al. | 463/25 |
| 2005/0148384 | A1 | 7/2005 | Marks et al. | 463/20 |
| 2005/0164775 | A1 | 7/2005 | Rodgers et al. | 463/20 |
| 2006/0063588 | A1 | 3/2006 | Poole | 463/25 |

FOREIGN PATENT DOCUMENTS

| | | |
|---|---|---|
| EP | 0981119 | 2/2008 |
| GB | 2242300 | 9/1991 |
| GB | 2367939 | 4/2002 |
| GB | 2383668 | 7/2003 |
| JP | 05-031254 | 2/1993 |
| JP | 10-277213 | 10/1998 |
| WO | WO 01/05477 | 2/2001 |
| WO | WO 01/33905 | 5/2001 |
| WO | WO 02/24288 | 3/2002 |
| WO | WO 02/40921 | 5/2002 |
| WO | WO 2006/009658 | 1/2006 |
| WO | WO 2006/076294 | 7/2006 |
| WO | WO 2007/002935 | 1/2007 |
| WO | WO 2007/130443 | 11/2007 |

OTHER PUBLICATIONS

International Application No. PCT/US06/19997, Written Opinion dated Mar. 19, 2007 (5 pages).

* cited by examiner

ROTATING WILD ROTATION 1
PAYLINES HIT: 1, 13, 15, 17

ROTATING WILD ROTATION 2
PAYLINES HIT: NONE

ROTATING WILD ROTATION 3
PAYLINES HIT: 8, 10, 12

ROTATING WILD ROTATION 4
PAYLINES HIT: 7, 9, 11

ROTATING WILD ROTATION 5
PAYLINES HIT: 8, 10, 12, 19

ROTATING WILD ROTATION 6
PAYLINES HIT: 7, 9, 11, 13, 15, 17, 19

DOUBLE ROTATING WILD ROTATION 1
PAYLINES HIT: 8, 10, 12, 21

DOUBLE ROTATING WILD ROTATION 2
PAYLINES HIT: 7, 9, 11, 21

DOUBLE ROTATING WILD ROTATION 3
PAYLINES HIT: 21

DOUBLE ROTATING WILD ROTATION 4
PAYLINES HIT: 21

DOUBLE ROTATING WILD ROTATION 5
PAYLINES HIT: 21

DOUBLE ROTATING WILD ROTATION 6
PAYLINES HIT: 21

DOUBLE ROTATING WILD ROTATION 7
PAYLINES HIT: 19, 21

DOUBLE ROTATING WILD ROTATION 8
PAYLINES HIT: 13, 15, 17, 21

GAMING MACHINE WITH ROTATING WILD FEATURE

CROSS-REFERENCE TO RELATED APPLICATION

This application is a U.S. national phase of International Application No. PCT/US2006/019997, filed May 24, 2006, which claims the benefit of priority of U.S. Provisional Patent Application No. 60/684,434, filed May 25, 2005, both of which are incorporated by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having a rotating wild feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present invention, a gaming machine for conducting a wagering game includes a value input device for receiving a wager, an array of positions for displaying respective randomly selected symbols, and a controller. The displayed symbols include a special symbol and a chain of adjacent symbols at least partially encompassing the special symbol. The controller is operative to progressively move and stop the chain of adjacent symbols at each of a plurality of locations and evaluate the array for any winning combinations of the displayed symbols when the chain of adjacent symbols is stopped at each location.

According to another aspect of the invention, a method of conducting a wagering game on a gaming machine comprises receiving a wager; displaying randomly selected symbols at respective positions in an array of positions, the displayed symbols including a special symbol and a chain of adjacent symbols at least partially encompassing the special symbol; progressively moving and stopping the chain of adjacent symbols at each of a plurality of locations; and evaluating the array for any winning combinations of the displayed symbols when the chain of adjacent symbols is stopped at each location According to yet another aspect of the invention, a computer readable storage medium is encoded with instructions for directing a gaming device to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1:
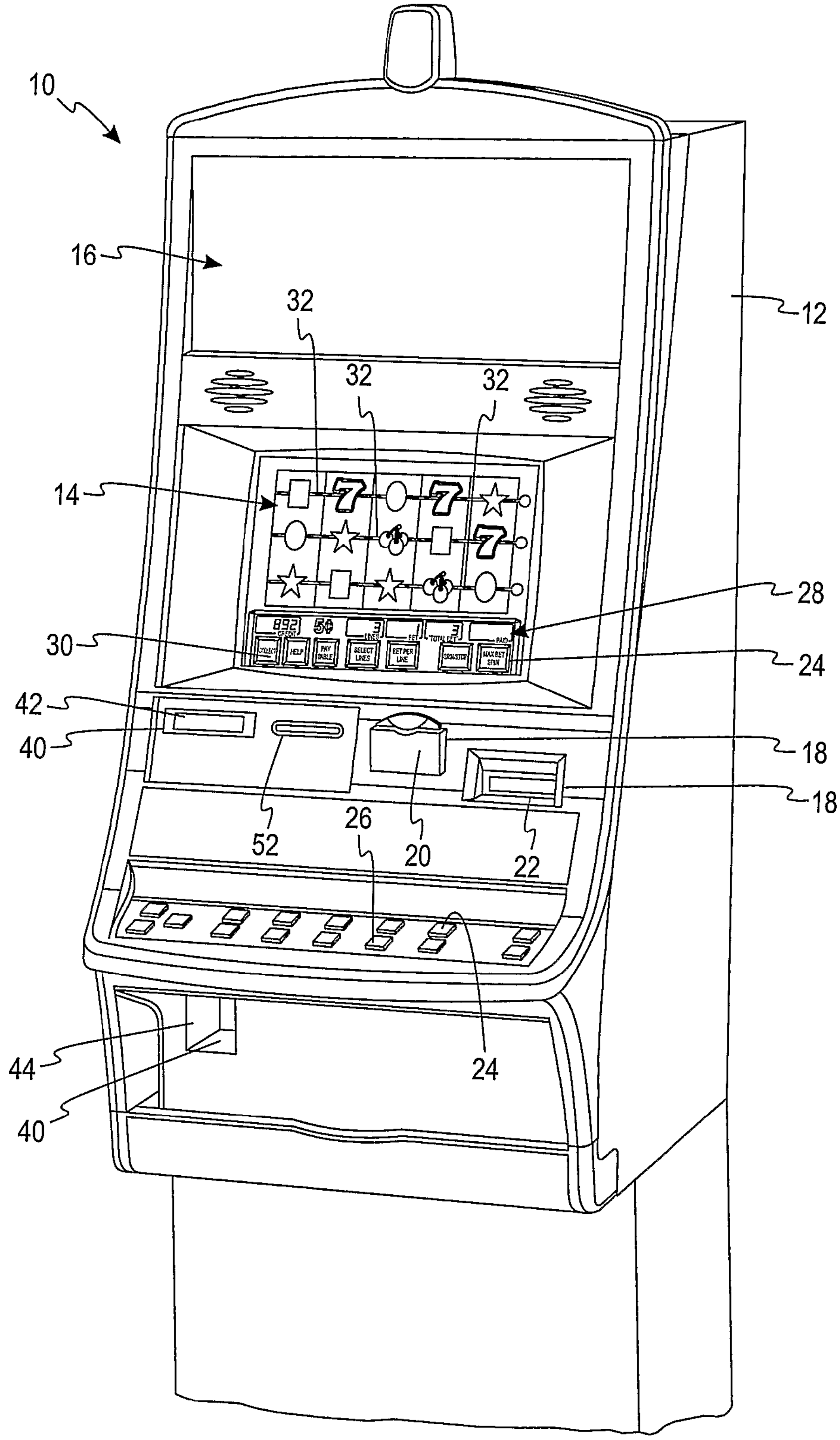
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
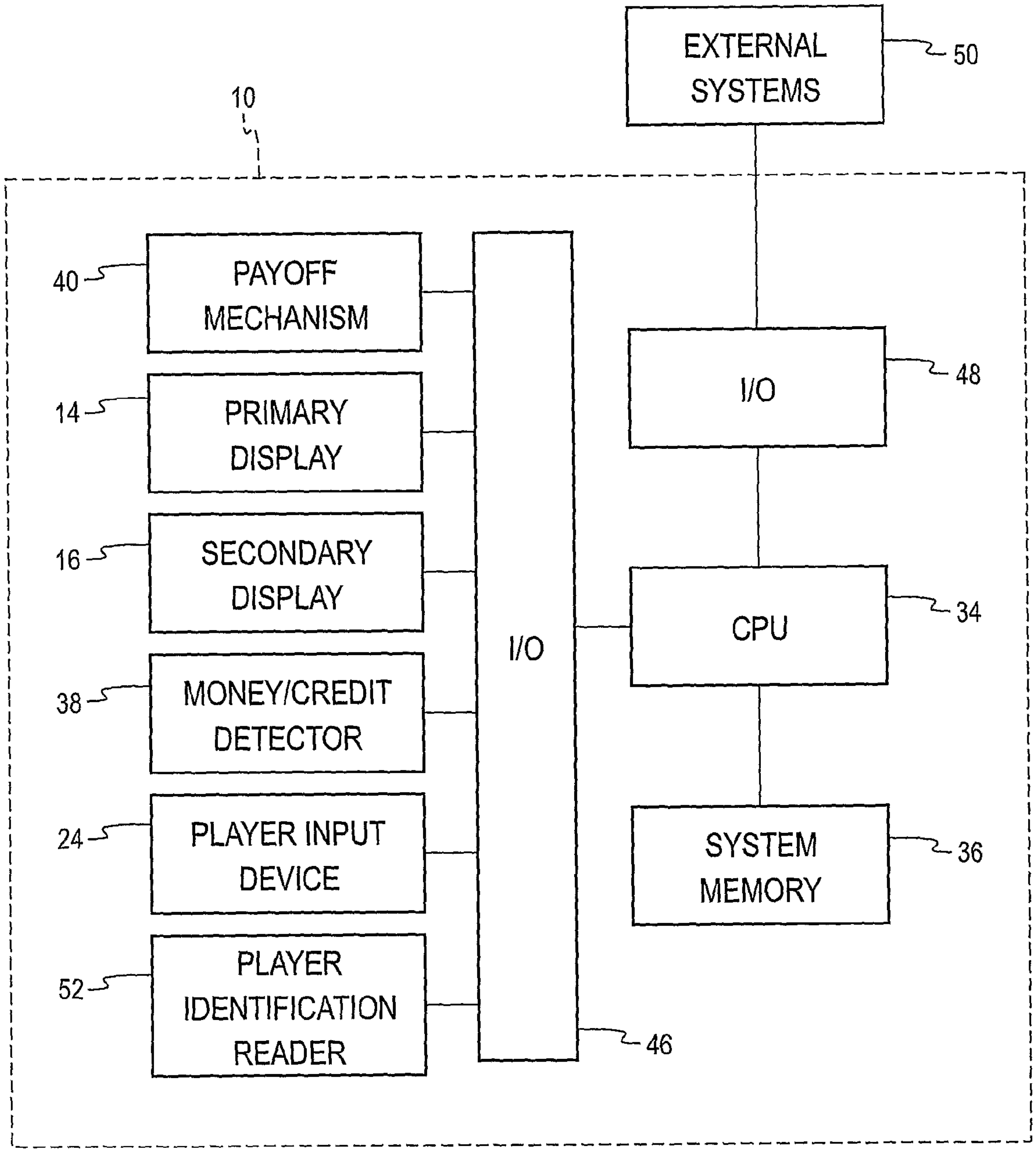
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
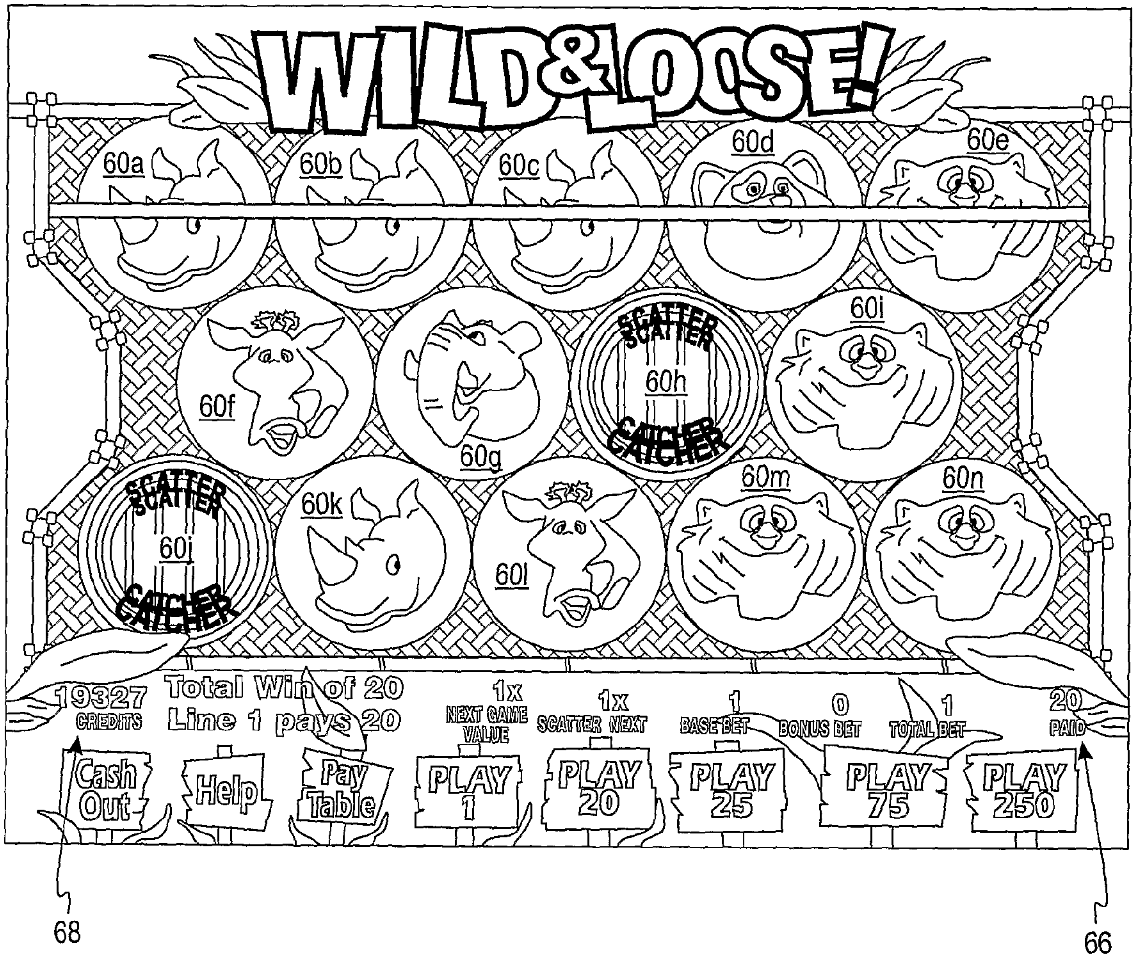
FIG. 3 is a display image associated with wagering game conducted on the gaming machine.

According to an embodiment of the present invention, a gaming machine conducts a wagering game called "Wild & Loose." With respect to the "Wild & Loose" game, the primary display 14 is preferably a video display. FIG. 3 depicts a display image associated with the "Wild & Loose" game. The game is implemented on a plurality of symbol-bearing reels that, in response to a wager, are rotated and stopped to place symbols at positions 60*a* through 60*n* in an array. Unless a specific position in the array is being specified, the positions 60*a* through 60*n* are referred to herein by reference numeral 60. The "5-4-5" array of symbol positions 60 may, for example, includes three rows where the top and bottom rows each include five aligned symbol positions 60 and the middle row includes four symbol positions. The top and bottom rows are aligned relative to each other, while the middle row is horizontally offset by one-half symbol position relative to the top and bottom rows. Each position 60 may be associated with a distinct simulated reel such that the fourteen illustrated positions 60 are associated with fourteen respective reels that are spun and stopped to generate symbols at the respective positions 60. Alternatively, a plurality of groups of multiple positions 60 may be associated with respective simulated reel, e.g. a first reel may generate symbols for the first position in each row, a second reel may generate symbols for the second position in each row, a third reel may generate symbols for the third position in each row, a fourth reel may generate symbols for the fourth position in each row, and a fifth reel may generate symbols for the fifth position in the top and bottom rows.

Figure 4:
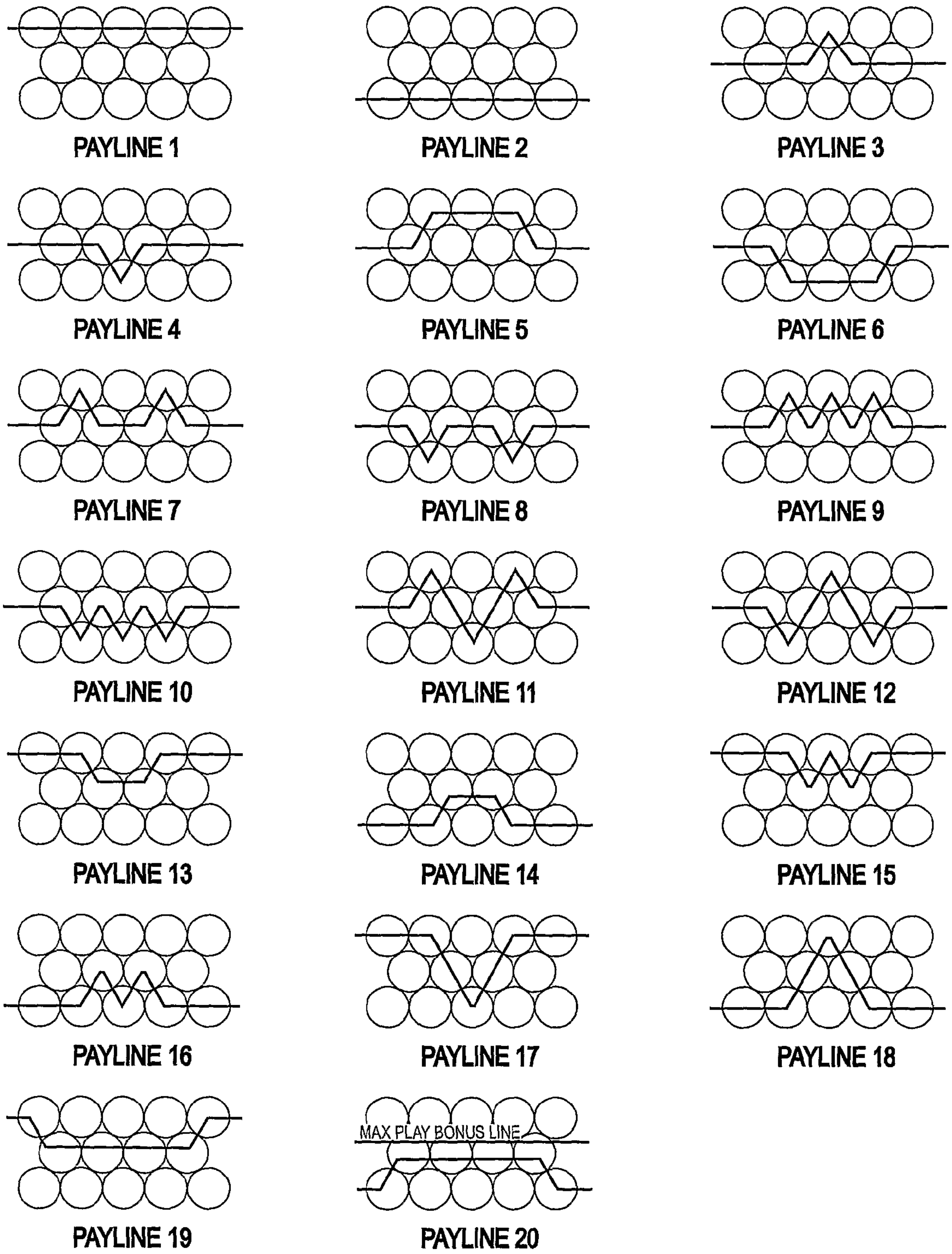
FIG. 4 depicts a series of diagrams of available paylines that are enabled according to a player's wager.

The game generates the symbols in FIG. 3 in visual associated with a plurality of paylines. FIG. 4 includes diagrams of the available paylines that are enabled according to a player's wager. The available paylines include paylines 1 through 20 and a Max Play Bonus Line. For ease of understanding, each payline is illustrated in a separate diagram relative to the array of symbol positions 60. The Max Play Bonus Line covers the middle row and is free (i.e. no extra wager) when paylines 1 through 20 are enabled, but is otherwise not enabled when less than 20 lines are selected.

Figure 5:
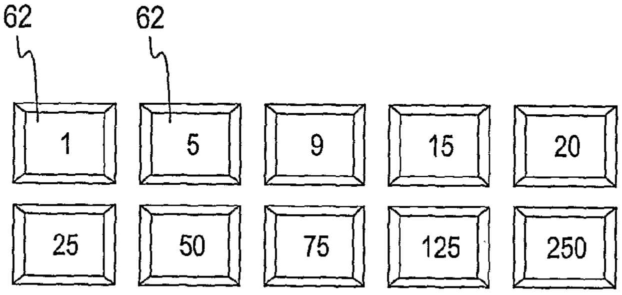
FIG. 5 depicts an arrangement of buttons on a button panel of the gaming machine for allowing a player to place a wager.

As noted above, the paylines are enabled according to a player's wager. FIG. 5 depicts an arrangement of buttons 62 on a button panel for allowing a player to place a wager. With respect to the "Wild & Loose" game, the video display 14 likewise includes on-screen icons, as shown in FIG. 3, which either mimic or abbreviate the ten-button panel in FIG. 5. The button panel arrangement includes, for example, ten buttons 62. Using the ten-button panel, the player selects the number of paylines and credits to wager per game cycle all with the click of one button. For example, selecting the "1" button enables payline 1 and wagers 1 credit; selecting the "9" button enables paylines 1 through 9 inclusive and wagers 9 credits; selecting the "20" button enables paylines 1 through 20 inclusive and the "Max Play Bonus Line" and wagers 20 credits; and so one. Choosing any of the buttons 62 from the upper portion of the ten-button panel selects paylines and wagers credits applying to the base bet only, thereby awarding the base pay for winning combinations occurring for the selected paylines only per game cycle. For example, selecting the "9" button paylines 1 through 9 inclusive and wagers 9 credits. Therefore, a winning combination of three Elephant symbols occurring on any of the selected paylines (i.e. 1 through 9 inclusive) awards 10 credits, which is the inherent award for that symbol combination. Choosing any of the buttons 62 from the lower portion of the ten-button panel selects paylines and wagers credits that apply to both the base bet and the bonus bet. Additionally, multipliers that range from 1 times (1×) to 10 times (10×) the wager are set for potential winning combinations applying to both the base and bonus bet. For example, selecting the "50" button enables all the available paylines (i.e. 1 through 20 inclusive plus the "Max Play Bonus Line") and wagers 50 credits. The wager is broken down as follows: 20 credits with a multiplier of 2 times (2×) applies towards the base bet and 5 credits with a multiplier of 2 times (2×) applied towards the bonus bet. Selecting the "75" button enables all the available paylines and wagers 75 credits. The wager is broken down as follows: 20 credits with a multiplier of 3 times (3×) applied towards the base bet and 5 credits with a multiplier of 3 times (3×) applied towards the bonus bet.

Figure 6:
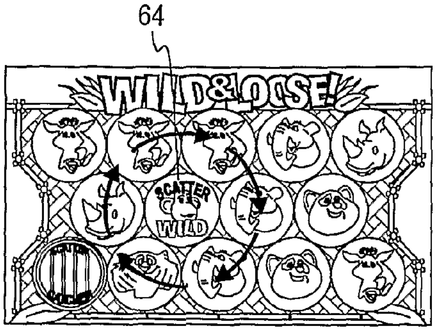
FIGS. 6 through 11 are a series of display images associated with a single rotating wild bonus of the wagering game.
Figure 7:
Figure 8:
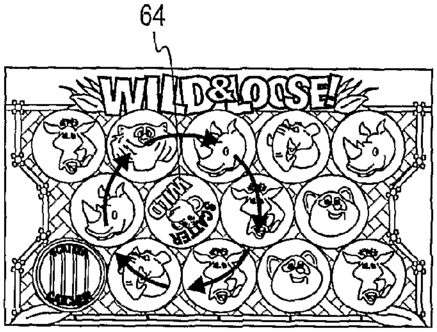
Figure 9:
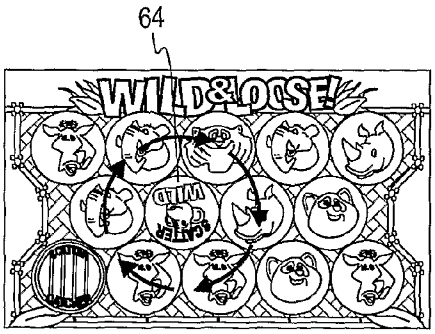
Figure 10:
Figure 11:
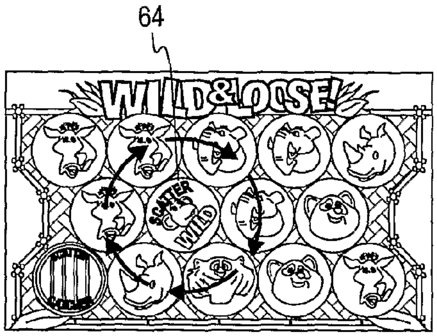

Referring to FIG. 6, a Rotating Wild Monkey symbol 64 in position 60*g* or position 62*h* (see FIG. 3 for specified positions 60*a* through 60*n*) triggers a single Rotating Wild bonus in which the surrounding symbol positions and their occupying symbols link with the Rotating Wild Monkey symbol 64 and rotate as one cohesive chain in a circular, clockwise pattern creating new potential awards. In one embodiment, all paylines must be enabled to qualify for the Rotating Wild bonus. In the illustrated example, a Rotating Wild Monkey symbol 64 appears in position 60*g* and, as a result, positions 60*b*, 60*c*, 60*f*, 60*h*, 60*k*, and 60*l* and their occupying symbols link with the Rotating Wild Monkey symbol 64 and rotate as one cohesive chain in a circular, clockwise pattern creating new potential awards.

Starting from the initial position in FIG. 6, the rotating chain progressively rotates to and stops at each of five different rotational positions shown in FIGS. 7 through 11 and then returns to the original position in FIG. 6. At each stopping position, the symbols in the symbol array are evaluated according to the pay table for any line pays (i.e. winning combinations of line paying symbols along enabled paylines) and scatter pays (i.e. winning combinations of scatter paying symbols in the symbol array, whether or not the symbols appear on an enabled payline). The player is awarded for all such line and scatter pays. The awards generated at the respective rotational positions accrue on a "paid" meter 66 (see FIG. 3) on the display and, at the conclusion of the Rotating Wild bonus, are transferred from the "paid" meter 66 to a "credits" meter 68 (see FIG. 3).

Figure 12:
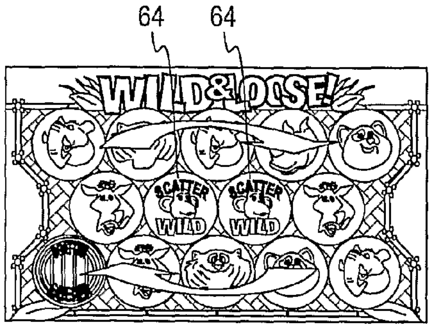
FIGS. 12 through 19 are a series of display images associated with a double rotating wild bonus of the wagering game.
Figure 13:
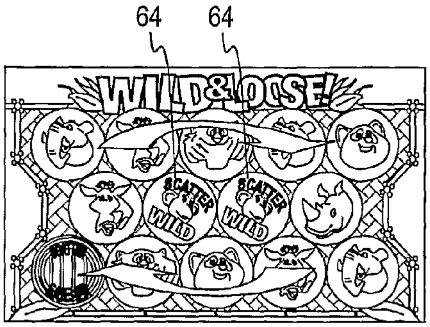
Figure 14:
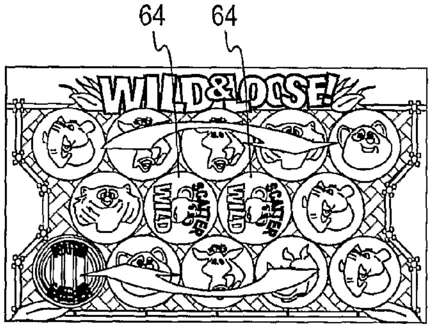
Figure 15:
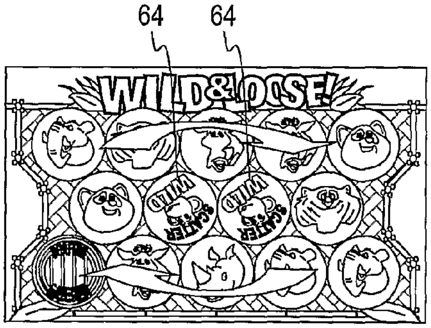
Figure 16:
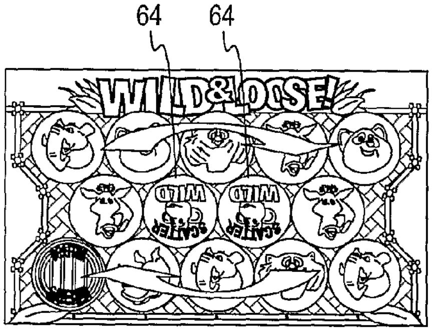
Figure 17:
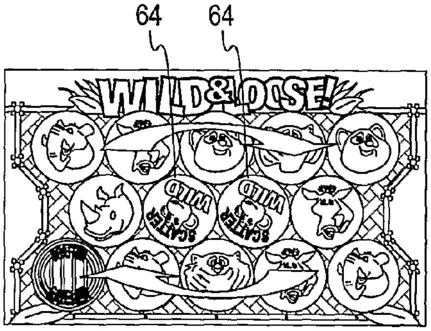
Figure 18:
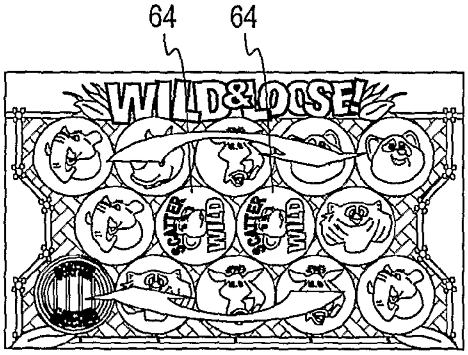
Figure 19:
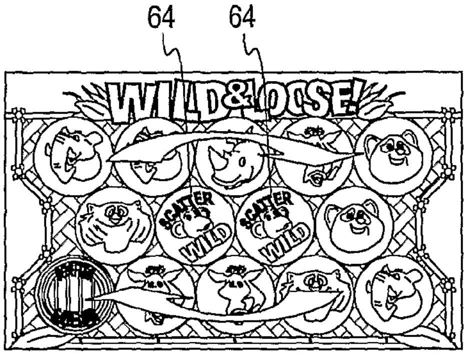

Referring to FIG. 12, Rotating Wild Monkey symbols 64 in positions 60*g* and 62*h* (see FIG. 3 for specified positions 60*a* through 60*n*) trigger a Double Rotating Wild bonus in which the surrounding symbol positions 60*b*, 60*c*, 60*d*, 60*f*, 60*i*, 60*k*, 60*l*, and 60*m* and their occupying symbols link with the Rotating Wild Monkey symbols 64 and rotate as one cohesive chain in an elliptical, clockwise pattern creating new potential awards. In one embodiment, all paylines must be enabled to qualify for the Double Rotating Wild bonus.

Starting from the initial position in FIG. 12, the rotating chain progressively rotates to and stops at each of seven different rotational positions shown in FIGS. 13 through 19 and then returns to the original position in FIG. 12. At each stopping position, the symbols in the symbol array are evaluated according to the pay table for any line pays (i.e. winning combinations of line paying symbols along enabled paylines) and scatter pays (i.e. winning combinations of scatter paying symbols in the symbol array, whether or not the symbols appear on an enabled payline). The player is awarded for all such line and scatter pays. The awards generated at the respective rotational positions accrue on a "paid" meter 66 (see FIG. 3) on the display and, at the conclusion of the Double Rotating Wild bonus, are transferred from the "paid" meter 66 to a "credits" meter 68 (see FIG. 3).

If each position 60 of the symbol array is associated with a distinct simulated reel, the Rotating Wild bonus causes the reels surrounding the triggering Rotating Wild Monkey symbol(s) 64 to progressively move to and stop at each of the rotational positions shown in the figures.

In an alternative embodiment, the "5-4-5" symbol array is replaced with a more conventional array of aligned rows and columns such as a 3×5 array having three rows and five columns. A rotating wild symbol in one of the three interior positions of a 3×5 array may trigger a rotating wild bonus in which the surrounding symbols/positions rotate to and stop at each of seven rotational positions and then return to the original, starting position. A rotating wild symbol in all three of the three interior positions of a 3×5 array may trigger a triple rotating wild bonus in which the surrounding symbols/positions rotate to and stop at each of eleven rotational positions and then return to the original, starting position. A rotating wild symbol in the single interior position of a 3×3 array may trigger a rotating wild bonus in which the surrounding symbols/positions rotate to and stop at each of seven rotational positions and then return to the original, starting position.

In another embodiment, a rotating wild bonus may be triggered by a rotating wild symbol in a peripheral position of the array. In this case, a symbol at position 60*j*, for example, would rotate to position 60*a* if these positions are part of the rotating chain. Likewise, a symbol at position 60*e* would rotate to position 60*n* if these positions are part of the rotating chain. Alternatively, upon triggering the rotating wild bonus, a random symbol may appear outside the array, e.g. at a position to the left of position 60*f*, and become part of the rotating chain to fill in any gaps that would otherwise exist in the chain.

In another embodiment, the symbol for triggering the rotating bonus need not be wild or may alternatively be transformed to a wild upon triggering the bonus.

In another embodiment, the rotating bonus may be triggered by a symbol or event occurring outside the symbol array such that the bonus is triggered independent from the symbols appearing in the array.

In another embodiment, the chain of symbols/positions in the bonus may move along a closed loop path or non-closed path that is neither circular nor elliptical.

Each of these embodiments and obvious variations thereof is contemplated as falling within the spirit and scope of the claimed invention, which is set forth in the following claims.

What is claimed is:

1. A gaming machine for conducting a wagering game, comprising:

a value input device for receiving a wager;

at least one display device configured to display an array of positions having respective randomly selected symbols, the array of positions including a plurality of adjacent groups of positions, the positions within each group being aligned relative to each other, each of the positions within at least one of the groups being adjacent to and offset relative to the positions within an adjacent one of the groups such that each of the positions within the at least one of the groups is adjacent to and not aligned with the positions within the adjacent one of the groups, the displayed symbols including a special symbol and a chain of adjacent symbols at least partially encompassing the special symbol; and a controller operative to, in response to the special symbol appearing in the array, progressively rotate the chain in a generally circular or elliptical motion about the special symbol as the special symbol remains in its position in the array, stop the chain of adjacent symbols at each of a plurality of locations, and evaluate the array for any winning combinations of the displayed symbols when the chain of adjacent symbols is stopped at each location.

2. The machine of claim 1, wherein the special symbol is a wild symbol that substitutes for other ones of the symbols.

3. The machine of claim 1, wherein the chain encompasses the special symbol.

4. The machine of claim 1, wherein the special symbol visually rotates as the chain rotates about the special symbols.

5. The machine of claim 1, wherein the controller is operative to evaluate the array for the winning combinations relative to one or more paylines.

6. The machine of claim 1, wherein each position is associated with a distinct simulated, symbol-bearing reel such that such that the positions are associated with respective reels that are spun and stopped to generate the respective displayed symbols.

7. The machine of claim 1, wherein the plurality of adjacent groups of positions are rows in the array.

8. The machine of claim 1, wherein the positions within the at least one of the groups are offset by one-half symbol position relative to the positions with the adjacent one of the groups.

9. The machine of claim 1, wherein the plurality of adjacent groups of positions include at least a first group of positions, a second group of positions, and a third group of positions, the second group of positions being between the first and third groups of positions, the positions within the second group being offset relative to the positions within the first and third groups, the positions within the first and third groups being aligned relative to each other.

10. The machine of claim 5, wherein at least one of the paylines covers a number of the positions greater than a number of the positions within any of the groups.

11. The machine of claim 10, wherein the plurality of adjacent groups includes at least three groups, and wherein the at least one of the paylines covers certain positions within at least two of the groups but not all of the groups.

12. The machine of claim 10, wherein the at least one of the paylines covers certain positions within all of the groups.

13. The machine of claim 10, wherein the covered positions within any one of the groups are not aligned with the covered positions within any other of the groups.

14. A method of conducting a wagering game on a gaming machine, comprising:

receiving a wager via an input device;

displaying, via at least one display device, randomly selected symbols at respective positions in an array of positions on one or more display devices, the array of positions including a plurality of adjacent groups of positions, the positions within each group being aligned relative to each other, each of the positions within at least one of the groups being adjacent to and offset relative to the positions within an adjacent one of the groups such that each of the positions within the at least one of the groups is adjacent to and not aligned with the positions within the adjacent one of the groups, the displayed symbols including a special symbol and a chain of adjacent symbols at least partially encompassing the special symbol;

using a controller to, in response to the special symbol appearing in the array, progressively rotate the chain in a generally circular or elliptical motion about the special symbol as the special symbol remains in its position in the array, and stop the chain of adjacent symbols at each of a plurality of locations; and using the controller to evaluate the array for any winning combinations of the displayed symbols when the chain of adjacent symbols is stopped at each location.

15. The method of claim 14, wherein the special symbol is a wild symbol that substitutes for other ones of the symbols.

16. The method of claim 14, wherein the chain encompasses the special symbol.

17. The method of claim 14, wherein the special symbol visually rotates as the chain rotates about the special symbols.

18. The method of claim 14, wherein the evaluating step includes evaluating the array for the winning combinations relative to one or more paylines.

19. The method of claim 14, wherein each position is associated with a distinct simulated, symbol-bearing reel such that such that the positions are associated with respective reels that are spun and stopped to generate the respective displayed symbols.

20. The method of claim 14, wherein the plurality of adjacent groups of positions include at least a first group of positions, a second group of positions, and a third group of positions, the second group of positions being between the first and third groups of positions, the positions within the second group being offset relative to the positions within the first and third groups, the positions within the first and third groups being aligned relative to each other.

21. The method of claim 18, wherein at least one of the paylines covers a number of the positions greater than a number of the positions within any of the groups.

22. The method of claim 21, wherein the plurality of adjacent groups includes at least three groups, and wherein the at least one of the paylines covers certain positions within at least two of the groups but not all of the groups.

23. The method of claim 21, wherein the at least one of the paylines covers certain positions within all of the groups.

24. A method of conducting a wagering game on a gaming machine, comprising:

receiving a wager via an input device;

displaying, via at least one display device, randomly selected symbols at respective positions in an array of positions on one or more display devices, the array of positions including a plurality of adjacent groups of positions, the positions within each group being aligned relative to each other, each of the positions within at least one of the groups being adjacent to and offset relative to the positions within an adjacent one of the groups such that each of the positions within the at least one of the groups is adjacent to and not aligned with the positions within the adjacent one of the groups, the displayed symbols including a special symbol and a chain of adjacent symbols;

in response to a predetermined event including the special symbol appearing in the array, using a controller to progressively rotate the chain in a generally circular or elliptical motion about the special symbol as the special symbol remains in its position in the array, and stop the chain of adjacent symbols at each of a plurality of locations; and using the controller to evaluate the array for any winning combinations of the displayed symbols when the chain of adjacent symbols is stopped at each location.

25. The method of claim 24, wherein the plurality of adjacent groups of positions are rows in the array.

26. The method of claim 24, wherein the positions within the at least one of the groups are offset by one-half symbol position relative to the positions with the adjacent one of the groups.

27. The method of claim 24, wherein the plurality of adjacent groups of positions include at least a first group of positions, a second group of positions, and a third group of positions, the second group of positions being between the first and third groups of positions, the positions within the second group being offset relative to the positions within the first and third groups, the positions within the first and third groups being aligned relative to each other.

* * * * *